United States Patent
Ishijima et al.

(10) Patent No.: US 12,404,853 B2
(45) Date of Patent: Sep. 2, 2025

(54) ELECTRIC OIL PUMP FOR AUTOMOBILE TRANSMISSION CLUTCH ENGAGEMENT, ELECTRIC OIL PUMP CONTROL METHOD FOR AUTOMOBILE TRANSMISSION CLUTCH ENGAGEMENT, VEHICLE, AND VEHICLE ELECTRIC OIL PUMP FOR AUTOMOBILE TRANSMISSION CLUTCH ENGAGEMENT

(71) Applicants: Mitsuba Corporation, Gunma (JP); Toyota Jidosha Kabushiki Kaisha, Aichi (JP)

(72) Inventors: Masahiro Ishijima, Kiryu (JP); Masahiro Fueki, Kiryu (JP); Shinji Shibuya, Kiryu (JP); Guodong Tan, Toyota (JP); Taiki Ishida, Toyota (JP); Tomohiro Chimbe, Toyota (JP)

(73) Assignees: Mitsuba Corporation, Gunma (JP); Toyota Jidosha Kabushiki Kaisha, Aichi (JP)

( * ) Notice: Subject to any disclaimer, the term of this patent is extended or adjusted under 35 U.S.C. 154(b) by 310 days.

(21) Appl. No.: 17/606,510

(22) PCT Filed: Feb. 6, 2020

(86) PCT No.: PCT/JP2020/004531
§ 371 (c)(1),
(2) Date: Aug. 17, 2022

(87) PCT Pub. No.: WO2020/250483
PCT Pub. Date: Dec. 17, 2020

(65) Prior Publication Data
US 2023/0246582 A1    Aug. 3, 2023

(51) Int. Cl.
*F04B 49/06* (2006.01)

(52) U.S. Cl.
CPC .... *F04B 49/06* (2013.01); *F16D 2500/70418* (2013.01)

(58) Field of Classification Search
CPC ...... F04B 2203/0209; F04B 2203/0205; F04B 2203/0201; H02P 29/0027; F16D 2048/0227
See application file for complete search history.

(56) References Cited

U.S. PATENT DOCUMENTS

| | | | |
|---|---|---|---|
| 2011/0135499 A1* | 6/2011 | Lee | F04B 49/06 417/44.1 |
| 2019/0234398 A1* | 8/2019 | Endo | F04B 49/20 |

FOREIGN PATENT DOCUMENTS

| | | |
|---|---|---|
| CN | 102401126 A | 4/2012 |
| CN | 109477479 A | 3/2019 |

(Continued)

OTHER PUBLICATIONS

Kogure, 'Control Device of Electric Oil Pump' Machine Translation of JP 2013068234, Apr. 2013 (Year: 2013).*

(Continued)

*Primary Examiner* — Kenneth J Hansen
(74) *Attorney, Agent, or Firm* — Wood Herron & Evans LLP (57) ABSTRACT

An electric oil pump for automobile transmission clutch engagement includes: a temperature sensor that measures a temperature of oil supplied to an oil supply destination relating to clutch engagement of an automobile transmission; an oil pump drive motor; a current determination part that determines a current value output to the oil pump drive motor to a predetermined current value determined such that the oil pump drive motor is capable of being driven without stopping in a case where the temperature is equal to or less than a predetermined temperature at which a torque of the oil pump drive motor becomes smaller than a load of the oil (Continued)

pump drive motor; and an oil pump that supplies oil to the oil supply destination by the oil pump drive motor being driven based on the determined current value.

8 Claims, 6 Drawing Sheets

(56) References Cited

FOREIGN PATENT DOCUMENTS

| | | | | |
|---|---|---|---|---|
| DE | 102013004971 A1 | 9/2013 | | |
| DE | 102015003195 A1 | 9/2015 | | |
| EP | 2322399 A1 | 5/2011 | | |
| EP | 2428704 A1 * | 3/2012 | ......... | F16H 61/0021 |
| EP | 2428705 B1 | 3/2012 | | |
| EP | 3540224 A1 * | 9/2019 | ............. | F04B 49/06 |
| JP | 2005110345 A | 4/2005 | | |
| JP | 2013068234 A * | 4/2013 | | |
| JP | 2013068267 A | 4/2013 | | |
| JP | 5834509 B | 5/2013 | | |
| JP | 2015035858 A | 2/2015 | | |
| JP | 5193259 B | 12/2015 | | |

OTHER PUBLICATIONS

Chinese Patent Office, Office Action issued in CN 202080037171.5 dated Aug. 16, 2022.
PCT Office, International Search Report issued in PCT/JP2020/004531 mailed on Apr. 7, 2020.
German Patent Office, Office Action issued in DE 112020002832.1 dated Oct. 13, 2023.

* cited by examiner

| CONTROL COMMAND | CONTROL MECHANISM AIM (%) | COMMAND DUTY RATIO (Duty) RANGE | AIM ROTATION SPEED (rpm) |
|---|---|---|---|
| EXTREMELY LOW TEMPERATURE ROTATION COMMAND | FIRST TARGET VALUE | Duty_A < Duty ≦ Duty_B | ROTATION SPEED CORRESPONDING TO PREDETERMINED SUPPLY AMOUNT OR MORE |
| ROTATION SPEED CONTROL COMMAND | SECOND TARGET VALUE | Duty_B < Duty ≦ Duty_C | MIN~MAX |

# ELECTRIC OIL PUMP FOR AUTOMOBILE TRANSMISSION CLUTCH ENGAGEMENT, ELECTRIC OIL PUMP CONTROL METHOD FOR AUTOMOBILE TRANSMISSION CLUTCH ENGAGEMENT, VEHICLE, AND VEHICLE ELECTRIC OIL PUMP FOR AUTOMOBILE TRANSMISSION CLUTCH ENGAGEMENT

TECHNICAL FIELD

The present invention relates to an electric oil pump for automobile transmission clutch engagement, an electric oil pump control method for automobile transmission clutch engagement, a vehicle, and a vehicle electric oil pump for automobile transmission clutch engagement.

Priority is claimed on Japanese Patent Application No. 2019-108893, filed on Jun. 11, 2019, the contents of which are incorporated herein by reference.

BACKGROUND

The viscosity of oil supplied by an electric oil pump changes depending on the temperature of the oil (hereinafter, referred to as an "oil temperature"). The viscosity of the oil increases as the oil temperature decreases. When the viscosity of the oil becomes larger, the load on the electric oil pump becomes higher. When the electric oil pump is used in a low to high temperature range (for example, −20° C. to 120° C.), the electric oil pump is required to supply a required flow rate while reducing electric power consumption by controlling the rotational speed of the motor. On the other hand, when the electric oil pump is used at an extremely low temperature (for example, −20° C. or less), the electric oil pump is required to supply a small amount of oil without stopping. In particular, most of oil pumps for automobile transmission clutch engagement operate for a short amount of time at an extremely low temperature.

However, when the electric oil pump is used at an extremely low temperature, there may be cases in which a sliding force load of the electric oil pump becomes high, and the motor cannot be started. Further, when the electric oil pump is used at an extremely low temperature, there may also be cases in which a motor torque is smaller than the sliding force load, and the electric oil pump stops. Therefore, a technique that can supply oil without stopping even at an extremely low temperature is required. Patent Document 1 describes a technique that performs a control such that stopping does not occur even when a load change occurs. Further, Patent Document 2 describes a technique that reduces a consumption amount of electric power by setting an upper limit of a current value. Further, Patent Document 3 describes a technique that performs a control at a lower limit of a rotation speed at which stopping does not occur.

RELATED ART DOCUMENTS

Patent Documents

[Patent Document 1]
  Japanese Patent No. 5193259
[Patent Document 2]
  Japanese Patent No. 5834509
[Patent Document 3]
  Japanese Unexamined Patent Application, First Publication No. 2015-035858

SUMMARY OF INVENTION

Problems to be Solved by the Invention

However, the technique described in Patent Document 1 is not a technique in which the oil temperature is considered. Further, in the technique described in Patent Document 2, there may be cases in which a required oil flow rate cannot be supplied depending on the upper limit of the current. Further, in the technique described in Patent Document 3, there may be cases in which a required oil flow rate cannot be supplied depending on the lower limit of the rotation speed. As described above, in the techniques described in Patent Document 1 to Patent Document 3, there may be cases in which it is not possible to ensure an oil flow rate without stopping in a use at an extremely low temperature.

An object of an aspect of the present invention is to provide a technique that can supply oil without stopping even in a use at an extremely low temperature.

Means for Solving the Problem

An electric oil pump for automobile transmission clutch engagement according to an aspect of the present invention includes: a temperature sensor that measures a temperature of oil supplied to an oil supply destination relating to clutch engagement of an automobile transmission; an oil pump drive motor; a current determination part that determines a current value output to the oil pump drive motor to a predetermined current value determined such that the oil pump drive motor is capable of being driven without stopping in a case where the temperature is equal to or less than a predetermined temperature at which a torque of the oil pump drive motor becomes smaller than a load of the oil pump drive motor; and an oil pump that supplies oil to the oil supply destination by the oil pump drive motor being driven based on the determined current value.

The electric oil pump for automobile transmission clutch engagement described above may further include: a rotation speed determination part that determines a rotation speed of the oil pump drive motor per predetermined time based on a correspondence relationship between a command duty ratio and an aim rotation speed in a case where the temperature is larger than the predetermined temperature, wherein the oil pump may supply oil to the oil supply destination by the oil pump drive motor being driven based on the determined rotation speed.

The electric oil pump for automobile transmission clutch engagement described above may further include: a command determination part that acquires a control command indicating that the oil pump is controlled based on a current value in a case where the temperature is equal to or less than the predetermined temperature, acquires a control command indicating that the oil pump is controlled based on a rotation speed in a case where the temperature is larger than the predetermined temperature, and determines whether the oil pump is controlled by either a current value or a rotation speed based on a control command, wherein in a case where it is determined that a control is performed by a current value, the current determination part may determine the current value, and in a case where it is determined that a control is performed by a rotation speed, the rotation speed determination part may determine the rotation speed.

An electric oil pump control method for automobile transmission clutch engagement according to another aspect of the present invention includes: by way of a vehicle control mechanism, measuring a temperature of oil supplied to an oil supply destination relating to clutch engagement of an automobile transmission; by way of the vehicle control mechanism, outputting, to an electric oil pump, a control command indicating that the electric oil pump is controlled based on a current value in a case where the temperature is equal to or less than a predetermined temperature at which a torque of the oil pump drive motor becomes smaller than a load of an oil pump drive motor; by way of the electric oil pump, determining a current value output to the oil pump drive motor to a predetermined current value determined such that the oil pump drive motor is capable of being driven without stopping based on the command signal; and by way of an oil pump, supplying oil to the oil supply destination by the oil pump drive motor being driven based on the determined current value.

A vehicle according to still another aspect of the present invention includes: a temperature sensor that measures a temperature of oil supplied to an oil supply destination relating to clutch engagement of an automobile transmission; an oil pump drive motor; a current determination part that determines a current value output to the oil pump drive motor to a predetermined current value determined such that the oil pump drive motor is capable of being driven without stopping in a case where the temperature is equal to or less than a predetermined temperature at which a torque of the oil pump drive motor becomes smaller than a load of the oil pump drive motor; and an oil pump that supplies oil to the oil supply destination by the oil pump drive motor being driven based on the determined current value.

A vehicle electric oil pump for automobile transmission clutch engagement according to still another aspect of the present invention includes: a temperature sensor that measures a temperature of oil supplied to an oil supply destination relating to clutch engagement of an automobile transmission; an oil pump drive motor; a current determination part that determines a current value output to the oil pump drive motor to a predetermined current value determined such that the oil pump drive motor is capable of being driven without stopping in a case where the temperature is equal to or less than a predetermined temperature at which a torque of the oil pump drive motor becomes smaller than a load of the oil pump drive motor; and an oil pump that supplies oil to the oil supply destination by the oil pump drive motor being driven based on the determined current value.

Advantage of the Invention

According to an aspect of the present invention, it is possible to supply oil without stopping even in a use at an extremely low temperature.

DESCRIPTION OF THE EMBODIMENTS

Figure 1:
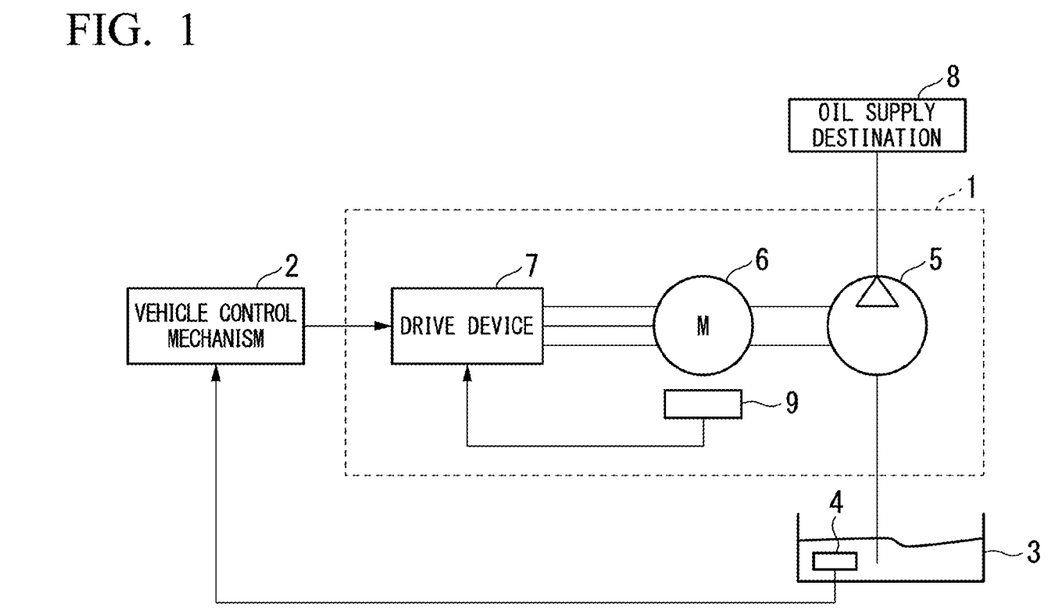
FIG. 1 is a view showing an example of a schematic configuration of an electric oil pump according to an embodiment.

FIG. 1 is a view showing an example of a schematic configuration of an electric oil pump 1 according to an embodiment. The electric oil pump 1 is used, for example, as a hydraulic pressure supply source that supplies oil to an oil supply destination 8 such as a transmission that is mounted on a vehicle. The electric oil pump 1 is connected to a vehicle control mechanism 2. The electric oil pump 1 pumps oil that is stored in an oil tank 3, applies a hydraulic pressure to the oil, and supplies the oil to the oil supply destination 8. The electric oil pump 1 supplies oil used for clutch engagement of a transmission of a vehicle such as an automobile. The oil supply destination 8 may be, for example, any device as long as the device relates to the clutch engagement of a transmission of a vehicle. The electric oil pump 1 is a specific example of an electric oil pump for automobile transmission clutch engagement.

The vehicle control mechanism 2 is connected to the electric oil pump 1 and a temperature sensor 4. The vehicle control mechanism 2 acquires an oil temperature (hereinafter, referred to as a "measured oil temperature") measured by the temperature sensor 4. The vehicle control mechanism 2 determines a control command and a command duty ratio on the basis of the measured oil temperature. When the control command is determined, the vehicle control mechanism 2 may determine the control command on the basis of a table in which a measured oil temperature is associated with a control command, or may determine the control command on the basis of the command duty ratio. The vehicle control mechanism 2 determines a required duty ratio on the basis of the measured oil temperature and the like.

Figure 2:
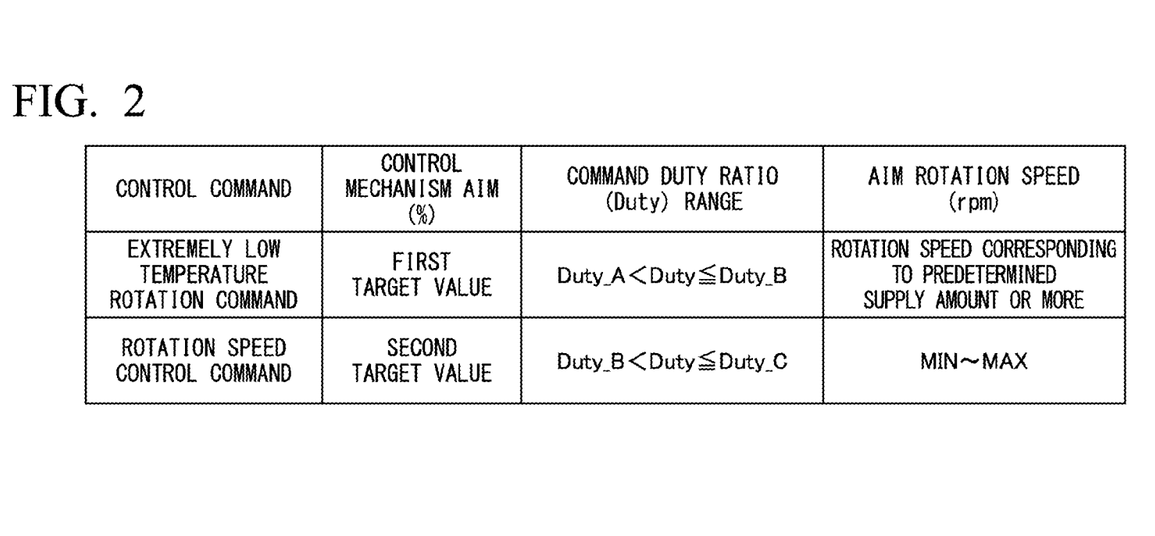
FIG. 2 is a view showing an example of a control command according to the embodiment.

FIG. 2 is a view showing an example of a control command according to the embodiment. In the embodiment, the control command includes an extremely low temperature rotation command and a rotation speed control command. Each control command is associated with a control mechanism aim (%), a command duty ratio (Duty) range, and an aim rotation speed (rpm). The control mechanism aim (%) is a target value of a calculated command duty ratio. The command duty ratio range represents a range of a command duty ratio after being processed by the electric oil pump 1. The aim rotation speed (rpm) is a target of the rotation speed of an oil pump drive motor 6. The electric oil pump 1 determines a command current value such that a rotation speed of the rotation speed aim (rpm) is ensured.

An extremely low temperature rotation command is a command for driving the electric oil pump when the measured oil temperature is an extremely low temperature. The vehicle control mechanism 2 determines the control command to an extremely low temperature rotation command when the measured oil temperature is lower than the extremely low temperature. An extremely low temperature may be, for example, a temperature at which a torque of the motor becomes smaller than a load of the motor. The temperature at which the torque of the motor becomes smaller than the load of the motor may mean, for example, that the measured oil temperature is equal to or less than −20° C. On the other hand, a temperature that is not an extremely low temperature is a temperature at which the measured oil temperature is larger than −20° C. and is equal to or less than 120° C. In this case, the command duty ratio range is larger than a Duty_A and is equal to or less than a Duty_B. When the control command is determined to be an extremely low temperature rotation command, the electric oil pump 1 aims to set a rotation speed at which an oil amount of a predetermined supply amount or more can be supplied to the oil supply destination 8. The predetermined supply amount is, for example, a minimum oil amount for the electric oil pump 1 to generate a clutch engagement hydraulic pressure. The Duty_A is a lower limit of the command duty ratio in an extremely low temperature rotation command. The Duty_A is a predetermined value. The Duty_B is an upper limit of the command duty ratio in an extremely low temperature rotation command. The Duty_B is a predetermined value.

The rotation speed control command is a command for ensuring a rotation speed in accordance with the command duty ratio when the measured oil temperature is not an extremely low temperature. The vehicle control mechanism 2 determines the control command to be the rotation speed control command when the measured oil temperature is equal to or more than an extremely low temperature. In this case, the command duty ratio range is larger than the Duty_B and is equal to or less than a Duty_C. When the control command is determined to be the rotation speed control command, the electric oil pump 1 determines a rotation speed from a MIN to a MAX as the aim rotation speed (rpm) in accordance with the command duty ratio. The Duty_B is a lower limit of the command duty ratio in the rotation speed control command. The Duty_C is an upper limit of the command duty ratio in the rotation speed control command. The Duty_C is a predetermined value. The MIN represents a lower limit of the aim rotation speed in the rotation speed control command. The MIN is a predetermined rotation speed. The MAX represents an upper limit of the aim rotation speed in the rotation speed control command. The MAX is a predetermined rotation speed.

With reference back to FIG. 1, the vehicle control mechanism 2 is described. The vehicle control mechanism 2 outputs a command signal to the electric oil pump 1. The vehicle control mechanism 2 may drive the electric oil pump 1 in order to supply oil to the oil supply destination 8 when the engine stops due to an idling stop or the like. For example, the vehicle control mechanism 2 may transmit a command signal to the electric oil pump 1 in response to a measurement temperature measured by the temperature sensor 4 when the engine stops. The temperature sensor 4 measures the temperature of the oil stored in the oil tank 3. The temperature sensor 4 outputs the measured oil temperature to the vehicle control mechanism 2.

Next, the electric oil pump 1 is described. The electric oil pump 1 includes an oil pump 5, an oil pump drive motor 6, a drive device 7, and a magnetic pole position sensor 9.

The oil pump 5 is connected to the oil pump drive motor 6 and the oil supply destination 8. The oil pump 5 is a pump driven by the oil pump drive motor 6. The oil pump 5 is driven by the oil pump drive motor 6, thereby suctions the oil in the oil tank 3 and supplies the oil to the oil supply destination 8.

The oil pump drive motor 6 drives the oil pump 5. The oil pump drive motor 6 includes a rotor having a permanent magnet and a stator in which coils LU, LV, and LW each corresponding to each of three phases (U, V, and W) are wound in this order in a rotation direction of the rotor. Each of the coils LU, LV, and LW of each phase is connected to the drive device 7. For example, the oil pump drive motor 6 is a brushless motor.

The drive device 7 is connected to the vehicle control mechanism 2 and the oil pump drive motor 6. The drive device 7 controls driving of the oil pump drive motor 6 on the basis of a command signal that is output from the vehicle control mechanism 2. For example, the drive device 7 generates a drive duty on the basis of the command signal that is input from the vehicle control mechanism 2. The drive device 7 converts a DC voltage to a three-phase voltage on the basis of the generated drive duty. The drive device 7 controls the driving of the oil pump drive motor 6 by outputting the three-phase voltage to the oil pump drive motor 6.

The magnetic pole position sensor 9 detects a magnetic pole position of the oil pump drive motor 6. Then, the magnetic pole position sensor 9 outputs a detection signal in accordance with the detected magnetic pole position to the drive device 7.

Figure 3:
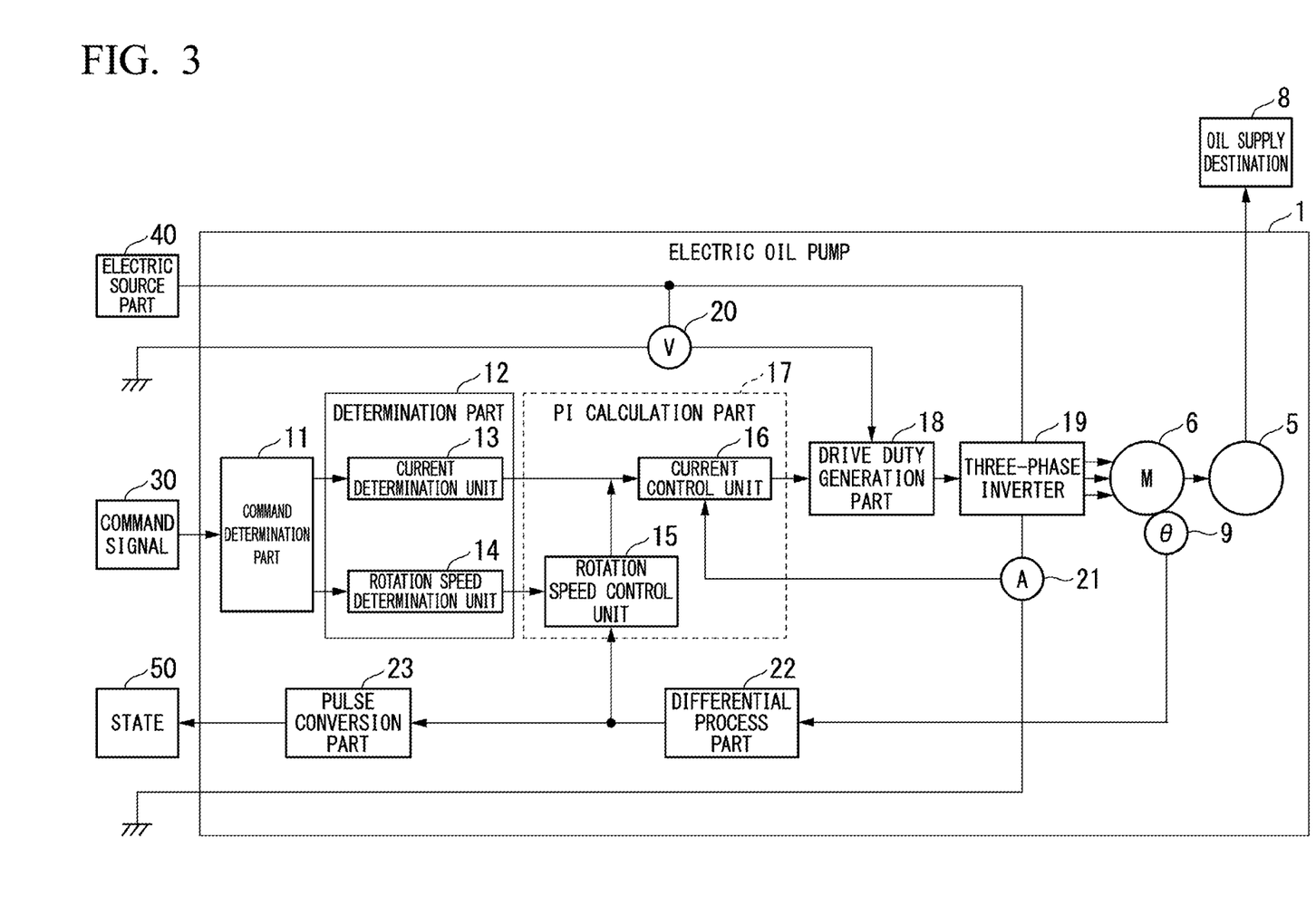
FIG. 3 is a functional block diagram showing an example of a functional configuration of the electric oil pump according to the embodiment.

FIG. 3 is a functional block diagram showing an example of a functional configuration of the electric oil pump 1 according to the embodiment. The electric oil pump 1 includes the oil pump 5, the oil pump drive motor 6, the magnetic pole position sensor 9, a command determination part 11, a determination part 12, a rotation speed control unit 15, a current control unit 16, a drive duty generation part 18, a three-phase inverter 19, a voltage sensor 20, a current sensor 21, a differential process part 22, and a pulse conversion part 23. The electric oil pump 1 supplies oil to the oil supply destination 8. The electric oil pump 1 receives a command signal 30. The electric oil pump 1 is connected to an electric source part 40. The electric oil pump 1 outputs a state 50. The command determination part 11, the determination part 12, the rotation speed control unit 15, the current control unit 16, the drive duty generation part 18, the three-phase inverter 19, the voltage sensor 20, the current sensor 21, the differential process part 22, and the pulse conversion part 23 are functions provided by the drive device 7. The oil pump 5, the oil pump drive motor 6, and the magnetic pole position sensor 9 have been described above and are therefore not described.

The command determination part 11 receives the command signal 30. The command determination part 11 determines whether or not a control command included in the command signal 30 is an extremely low temperature rotation command. When the control command is an extremely low temperature rotation command, the command determination part 11 outputs a command duty ratio included in the command signal 30 to a current determination unit 13 of the determination part 12. When the control command is not an extremely low temperature rotational command, the command determination part 11 outputs the command duty ratio included in the command signal 30 to a rotation speed determination unit 14 of the determination part 12.

The determination part 12 includes the current determination unit 13 and the rotation speed determination unit 14. The determination part 12 determines predetermined information on the basis of the command duty ratio output from the command determination part 11. The predetermined information may be, for example, a command current value or may be a command rotation speed. The following is specific description.

When an extremely low temperature rotation command is output as the control command, the current determination unit 13 determines the command current value. The command current value is a target current value for controlling the oil pump drive motor 6. The command current value is a predetermined current value. The command current value may be, for example, a current value (for example, a maximum current which the drive device 7 is capable of outputting such as a limit value of a phase current) determined such that the oil pump drive motor 6 is capable of being driven without stopping even at an extremely low temperature. When the control command is an extremely low temperature rotation command, a current control is performed on the oil pump drive motor 6. The current control is a control method that controls the oil pump drive motor 6 along an electrical time constant. The current control is a control method that performs a control such that a change in an output current does not occur in response to the variation of a voltage or a load. The current determination unit 13 outputs the command current value to the current control unit 16.

When the rotation speed control command is output as the control command, the rotation speed determination unit 14 determines the command rotation speed on the basis of the command duty ratio. The command rotation speed is a target rotation speed for performing a rotation speed control. The command rotation speed may be a rotation speed determined by performing a predetermined calculation on the command duty ratio. The command rotation speed may be a rotation speed in accordance with a flow rate required by the oil supply destination 8. The rotation speed control is a control method that determines a response property so as to control the oil pump drive motor 6 along a mechanical time constant. For example, when the rotation speed control command is output, the rotation speed determination unit 14 calculates a command rotation speed N on the basis of a numerical value obtained by multiplying the command duty ratio by a predetermined coefficient. The rotation speed determination unit 14 determines the command rotation speed in a range from the MIN to the MAX.

When the calculated command rotation speed N exceeds the MAX, the rotation speed determination unit 14 changes the command rotation speed N to the MAX. When the calculated command rotation speed N is less than the MIN, the rotation speed determination unit 14 changes the command rotation speed N to the MIN. The rotation speed determination unit 14 outputs the command rotation speed to the rotation speed control unit 15.

The rotation speed control unit 15 calculates a deviation (hereinafter, referred to as a "rotation speed difference value") between a command rotation speed and an actual rotation speed that is output from the differential process part 22. The rotation speed control unit 15 calculates a command current value on the basis of the calculated rotation speed difference value by using a commonly known PI (Proportional Integral) control or a PID (Proportional Integral Derivative) control.

The current control unit 16 calculates a deviation (hereinafter, referred to as a "current difference value") between a command current value and an actual current value that is output from the current sensor 21. The current control unit 16 calculates a command voltage value on the basis of the calculated current difference value by using a commonly known PI control or a PID control. The rotation speed control unit 15 and the current control unit 16 are integrally referred to as a PI calculation part 17. When it is determined that the rotation speed control is performed as the control method, the PI calculation part 17 calculates the command voltage value on the basis of the command rotation speed by performing a cascade control on the basis of the rotation speed control unit 15 and the current control unit 16.

The drive duty generation part 18 calculates a drive duty ratio on the basis of a command voltage value and an actual voltage value that is output from the voltage sensor 20. The drive duty generation part 18 outputs a PWM (Pulse Width Modulation) signal relating to the calculated drive duty ratio as a drive duty to the three-phase inverter 19.

The three-phase inverter 19 has a plurality of switching elements SW (not shown) and converts an electric source voltage to a phase voltage by switching ON and OFF of the switching elements. Specifically, the three-phase inverter 19 includes six switching elements. The three-phase inverter 19 acquires an electric source current from the electric source part 40. The three-phase inverter 19 switches ON and OFF of the six switching elements on the basis of the PWM signal that is input from the drive duty generation part 18. The three-phase inverter 19 converts a DC voltage to a three-phase voltage by switching ON and OFF of the six switching elements. The three-phase inverter 19 outputs the converted three-phase voltage to the oil pump drive motor 6. Each switching element is, for example, a FET (Field Effective Transistor) or an IGBT (Insulated Gate Bipolar Transistor). Each switching element is connected to a reflux diode in parallel.

The electric source part 40 is, for example, a battery mounted on a vehicle. The electric source part 40 may use a secondary battery such as a nickel-metal-hydride battery or a lithium-ion battery. Alternatively, an electric double layer capacitor (condenser) can also be used instead of the secondary battery. The electric source part 40 supplies the electric source current to the three-phase inverter 19.

The voltage sensor 20 measures a voltage value on the basis of the electric source current that is supplied from the electric source part 40.

The voltage sensor 20 outputs the measured voltage value as an actual voltage value to the drive duty generation part 18. The voltage sensor 20 is grounded. The current sensor 21 measures a current value on the basis of a phase current that is output from the three-phase inverter 19. The current sensor 21 outputs the measured current value as an actual current value to the current control unit 16. The current sensor 21 is grounded.

The differential process part 22 acquires a detection signal in accordance with the magnetic pole position that is detected by the magnetic pole position sensor 9. The differential process part 22 calculates an angular velocity of the oil pump drive motor 6 by differentiating the magnetic pole position that appears by the detection signal. The differential process part 22 calculates an actual rotation speed on the basis of the angular velocity. The differential process part 22 outputs the actual rotation speed to the rotation speed control unit 15 and the pulse conversion part 23.

The pulse conversion part 23 converts the output actual rotation number into a pulse signal. The pulse conversion part 23 outputs the converted pulse signal as the state 50 of the electric oil pump 1 to the vehicle control mechanism 2.

Figure 4:
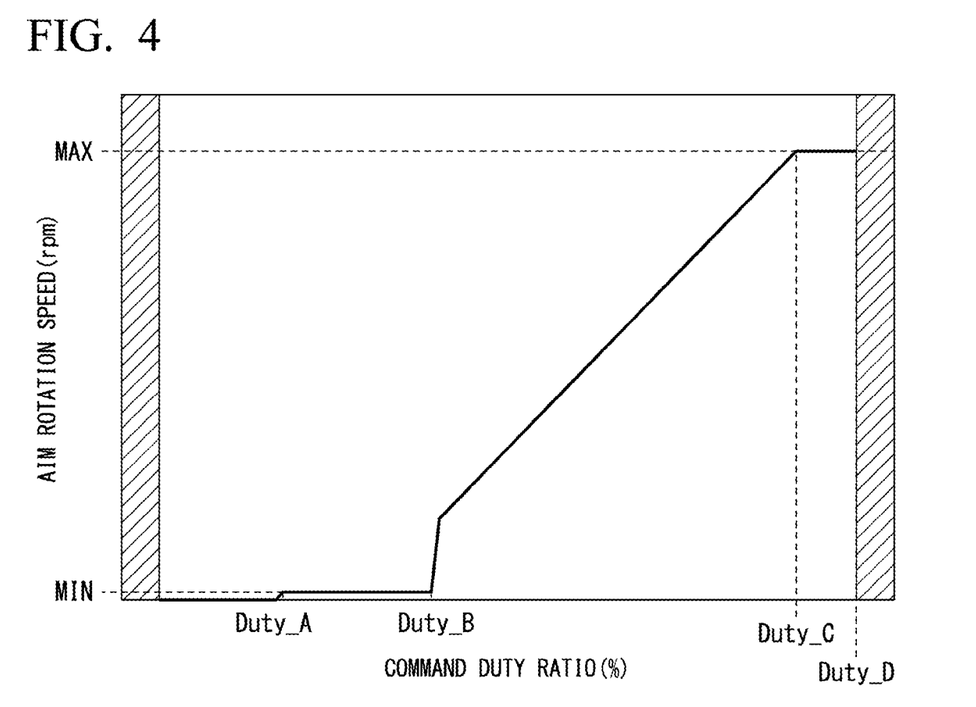
FIG. 4 is a view showing an example of a correspondence relationship between a command duty ratio and an aim rotation speed according to the embodiment.

FIG. 4 is a view showing an example of a correspondence relationship between a command duty ratio and an aim rotation speed according to the embodiment. The vertical axis represents an aim rotation speed (rpm). The horizontal axis represents a command duty ratio (%).

When the command duty ratio is larger than the Duty_A and is equal to or less than the Duty_B, the current determination unit 13 determines the command current value to a predetermined current value. The predetermined current value is, for example, a maximum current (for example, a phase current limit value) which the drive device 7 is capable of outputting. Accordingly, the rotation speed becomes a value that is output. In this case, the rotation speed fluctuates. When the command duty ratio is larger than the Duty_B and is equal to or less than the Duty_C, the aim rotation speed is the MIN (rpm) to the MAX (rpm). Specifically, the rotation speed determination unit 14 determines the command rotation speed on the basis of the command duty ratio. When the command duty ratio is larger than the Duty_C and is equal to or less than the Duty_D, the aim rotation speed is the MAX (rpm). Accordingly, the rotation speed determination unit 14 determines the command rotation speed to the MAX (rpm). The Duty_D is a value that represents the command duty ratio. When the command duty ratio is larger than zero and is equal to or less than the Duty_A, the determination part 12 may determine that the command duty ratio is an abnormal value. In this case, the determination part 12 may determine that an abnormality such as a disconnection or a battery short circuit occurs. In this case, the electric oil pump 1 performs a process in response to the abnormality. When the command duty ratio is larger than the Duty_D and is equal to or less than 100%, the determination part 12 may determine that the command duty ratio is an abnormal value. In this case, the determination part 12 may determine that an abnormality such as a GND short circuit occurs. In this case, the electric oil pump 1 performs a process in response to the abnormality.

Figure 5A:
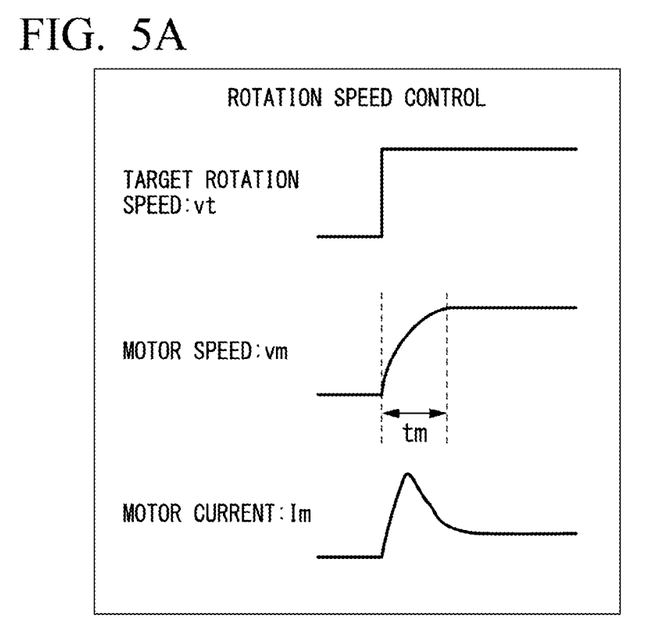
FIG. 5A is a view showing an example of a change in a current and a speed in a rotation speed control of the embodiment.
Figure 5B:
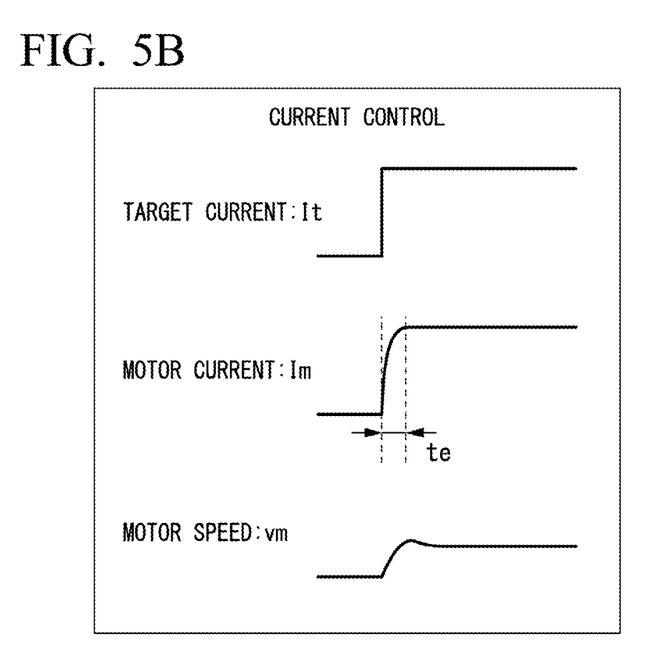
FIG. 5B is a view showing an example of a change in the current and the speed in the current control of the embodiment.

FIG. 5A and FIG. 5B are views showing an example of a change in a current and a speed in a rotation speed control and a current control of the embodiment. FIG. 5A is a view showing an example of a change in a current and a speed in a rotation speed control. In the rotation speed control, the rotation speed determination unit 14 determines a rotation speed of the oil pump drive motor 6. That is, a target rotation speed vt is determined. Next, the rotation speed control unit 15 determines the command current value such that the oil pump drive motor 6 is controlled along a rotation speed control target response time constant tm. The rotation speed control target response time constant tm is a time constant obtained by adding a mechanical time constant to an adjustment value for preventing overshooting. Accordingly, the motor rotation speed vm reaches the target rotation speed vt along the rotation speed control target response time constant tm. At this time, a motor current Im (command current value) that flows in the oil pump drive motor 6 changes as shown in a graph at the bottom of FIG. 5A.

FIG. 5B is a view showing an example of a change in the current and the speed in the current control. In the current control, the current determination unit 13 determines a target current It (command current value) of the oil pump drive motor 6. When the target current It is determined, the current control unit 16 controls the oil pump drive motor 6 along the electrical time constant te. Accordingly, the motor current Im reaches the target current It along the electrical time constant te. At this time, a motor rotation speed vm of the oil pump drive motor 6 changes as shown in a graph at the bottom of FIG. 5B. The rotation speed control target response time constant tm and the electrical time constant te become tm>te. Therefore, the hydraulic response is faster in the current control than in the rotation speed control.

Figure 6:
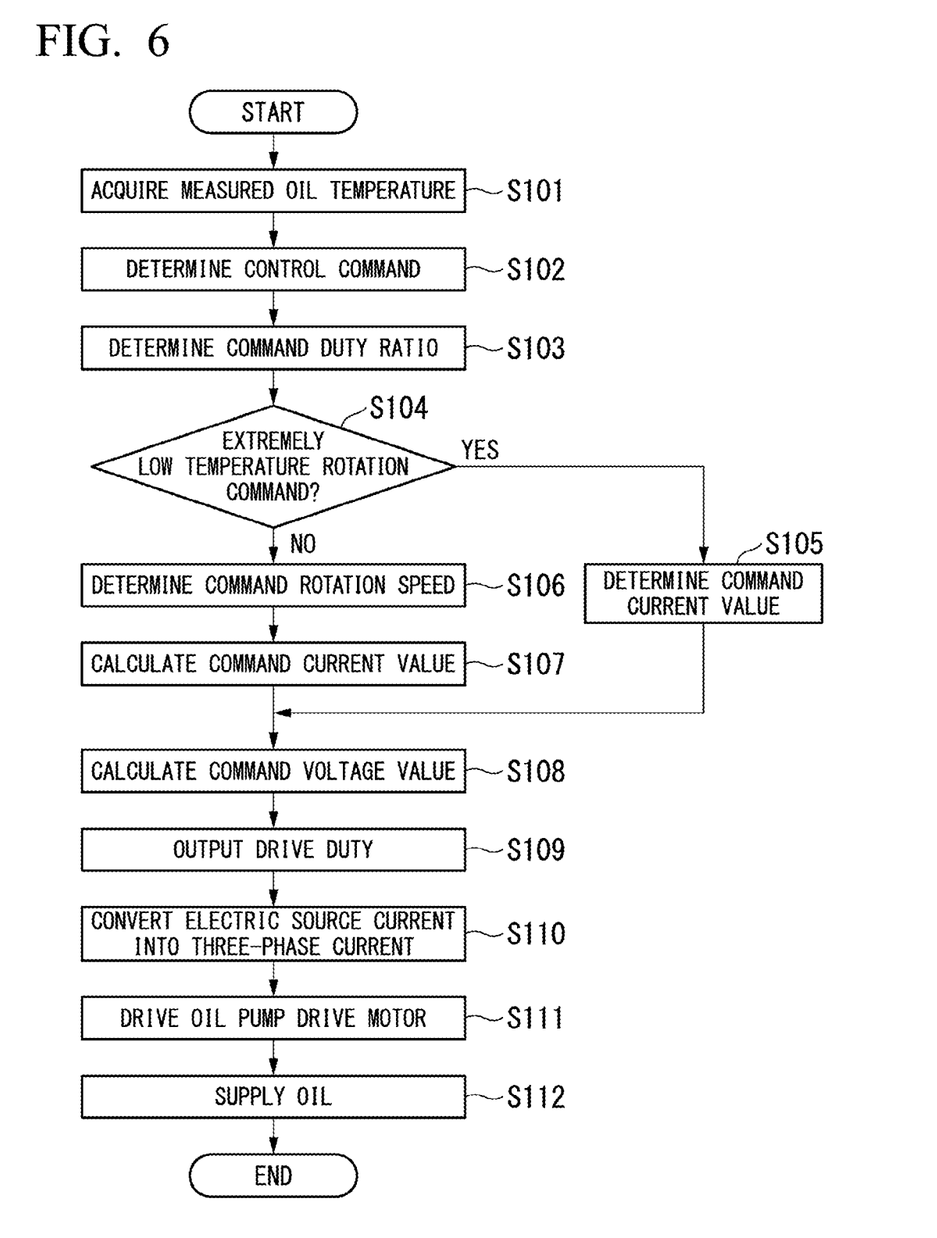
FIG. 6 is a flowchart showing an example of a process flow of performing an oil supply according to the embodiment.

FIG. 6 is a flowchart showing an example of a process flow of performing an oil supply of the embodiment.

The electric oil pump 1 performs a process when oil is supplied to the oil supply destination 8 at a predetermined timing. The vehicle control mechanism 2 acquires the measured oil temperature from the temperature sensor 4 (Step S101). The vehicle control mechanism 2 determines a control command on the basis of the measured oil temperature (Step S102). When the measured oil temperature is an extremely low temperature, the vehicle control mechanism 2 determines the control command to an extremely low temperature rotation command. When the measured oil temperature is not an extremely low temperature, the vehicle control mechanism 2 determines the control command to the rotation speed control command. The vehicle control mechanism 2 determines the command duty ratio on the basis of the measured oil temperature (Step S103). The vehicle control mechanism 2 outputs the command signal to the electric oil pump 1.

The command determination part 11 determines whether or not the determined control command is an extremely low temperature rotation command (Step S104). When the control command is an extremely low temperature rotation command (Step S104: YES), the command determination part 11 outputs the command duty ratio to the current determination unit 13. The current determination unit 13 determines the command current value (Step S105). When the control command is not an extremely low temperature rotation command (Step S104: NO), the command determination part 11 outputs the command duty ratio to the rotation speed determination unit 14. The rotation speed determination unit 14 determines the command rotation speed on the basis of the command duty ratio (Step S106). Next, the rotation speed control unit 15 calculates the command current value on the basis of a rotation speed difference value (Step S107). The current control unit 16 calculates a current difference value. The current control unit 16 calculates the command voltage value on the basis of the calculated current difference value (Step S108).

The drive duty generation part 18 controls a drive duty ratio on the basis of the actual voltage value and the command voltage value. The drive duty generation part 18 outputs, as a drive duty, a PWM signal of the drive duty ratio to the three-phase inverter 19 (Step S109). The three-phase inverter 19 acquires an electric source current from the electric source part 40. The three-phase inverter 19 converts a DC current into a three-phase current by switching ON and OFF of the six switching elements on the basis of the PWM signal (drive duty) input from the drive duty generation part 18 (Step S110). The three-phase inverter 19 outputs the converted three-phase current to the oil pump drive motor 6. The oil pump drive motor 6 is driven in response to the output three-phase current (Step S111). The oil pump drive motor 6 is driven, and thereby, the oil pump 5 supplies the oil in the oil tank 3 to the oil supply destination 8 (Step S112).

The electric oil pump 1 having such a configuration performs a current control of the oil pump 5 when the measured oil temperature is a temperature at which the torque is smaller than the load of the oil pump drive motor 6 such as an extremely low temperature. Since a torque response of the oil pump drive motor 6 is proportional to a current response, it is possible to ensure a higher torque than the rotation speed control. Therefore, the electric oil pump 1 can generate a clutch engagement hydraulic pressure of the vehicle transmission by starting the oil pump drive motor 6 at a low rotation and a high torque even when the measured oil temperature is an extremely low temperature. Further, in the electric oil pump 1, by performing the current control, tracking to a load variation becomes faster. Accordingly, the oil pump drive motor 6 rotates without stopping even at an extremely low temperature. Therefore, the oil pump 5 of the electric oil pump 1 is capable of supplying oil to the oil supply destination 8.

Further, the electric oil pump 1 performs a rotation speed control of the oil pump 5 when the measured temperature is not an extremely low temperature (for example, is not a temperature at which the torque is smaller than the load of the oil pump drive motor 6). That is, the rotation speed determination unit 14 determines the rotation speed of the oil pump drive motor 6 in accordance with a correspondence relationship between the command duty ratio and the aim rotation speed in response to the required flow rate of the oil supply destination 8. Accordingly, by changing the rotation speed in response to the required flow rate, the electric oil pump 1 can ensure the flow rate on demand while reducing the electric power consumption.

Further, the electric oil pump 1 acquires a control command indicating whether the oil pump 5 is controlled by either the current value or the rotation speed on the basis of the measured temperature. When the acquired control command indicates that the control is performed by the current value, the current determination unit 13 determines the current value, and when it is determined that the control is performed by the rotation speed, the rotation speed determination unit 14 determines the rotation speed. Accordingly, the electric oil pump 1 can perform the current control only at an extremely low temperature and control the oil pump drive motor 6 by the rotation speed control when the temperature is other than an extremely low temperature.

Further, the torque constant is proportional to the size of the oil pump drive motor. Therefore, as a means for ensuring the flow rate of the oil when the measured temperature is an extremely low temperature, there is means in which an electric oil pump includes an oil pump drive motor that is larger than the oil pump drive motor 6 included in the electric oil pump 1. According to such a configuration, the electric oil pump can ensure an oil flow rate even at an extremely low temperature. However, in such a configuration, the size of the electric oil pump becomes larger. The electric oil pump 1 of the embodiment described above switches the control of the oil pump drive motor 6 to the current control at an extremely low temperature. Therefore, the electric oil pump 1 can ensure the maximum torque without stopping even at an extremely low temperature, and it is possible to ensure the oil flow rate without increasing the size of the oil pump drive motor 6.

The drive device 7 in the embodiment described above may be realized by a computer. In that case, a program for realizing the function may be recorded in a computer-readable recording medium, the program recorded in the recording medium may be read into and executed by a computer system, and thereby, the function may be realized. It is assumed that the term "computer system" used herein includes an OS or hardware such as peripherals. Further, the term "computer-readable recording medium" refers to a portable medium such as a flexible disk, a magneto-optical disk, a ROM, or a CD-ROM or a storage device such as a hard disk embedded in the computer system. Further, the term "computer-readable recording medium" may include a medium which dynamically holds a program for a short time such as a communication line in a case where a program is transmitted through a network such as the Internet or a communication line such as a telephone line or a medium which holds a program for a given time such as a volatile memory in a computer system that becomes a server or a client in the case. Further, the above program may be a program for realizing some of the above-described functions, may be a program which can realize the above-described functions by a combination with a program already recorded in the computer system, or may be a program implemented using a programmable logic device such as a FPGA (Field Programmable Gate Array).

Although the embodiment of the present invention has been described in detail with reference to the drawings, the specific configuration is not limited to this embodiment, and designs that do not depart from the scope of the invention and the like are also included.

DESCRIPTION OF THE REFERENCE SYMBOLS

1 Electric oil pump
2 Vehicle control mechanism
3 Oil tank
4 Temperature sensor
5 Oil pump
6 Oil pump drive motor
7 Drive device
8 Oil supply destination
9 Magnetic pole position sensor
11 Command determination part
12 Determination part
13 Current determination unit
14 Rotation speed determination unit
15 Rotation speed control unit
16 Current control unit
17 PI calculation part
18 Drive duty generation part
19 Three-phase inverter
20 Voltage sensor
21 Current sensor
22 Differential process part
23 Pulse conversion part
30 Command signal
40 Electric source part
50 State

The invention claimed is:

1. An electric oil pump for automobile transmission clutch engagement, comprising:
   a temperature sensor that measures a temperature of oil supplied to an oil supply destination relating to clutch engagement of an automobile transmission;
   an oil pump drive motor; and
   a drive device that includes a computer and a program executed by the computer for realizing a current determination part and a rotation speed determination part,
   wherein in a case where the temperature of the oil measured by the temperature sensor is equal to or less than a first temperature and a torque of the oil pump drive motor is smaller than a load of the oil pump drive motor, a current control is performed in which the current determination part determines a current value output to the oil pump drive motor to a predetermined current value determined such that the oil pump drive motor is capable of being driven without stopping, and the oil pump supplies oil to the oil supply destination by the oil pump drive motor being driven based on the determined current value; and
   in a case where the temperature of the oil measured by the temperature sensor is larger than the first temperature and the torque of the oil pump drive motor is not smaller than the load of the oil pump drive motor, a rotation speed control is performed in which the rotation speed determination part determines a rotation speed of the oil pump drive motor per predetermined time based on a correspondence relationship between a command duty ratio and an aim rotation speed in response to a required flow rate of the oil supply destination, and the oil pump supplies oil to the oil supply destination by the oil pump drive motor being driven based on the determined rotation speed.

2. The electric oil pump for automobile transmission clutch engagement according to claim 1,
wherein the program of the drive device further realizes a command determination part,
the command determination part acquires a control command indicating that the oil pump is controlled based on a current value in a case where the temperature of the oil measured by the temperature sensor is equal to or less than the first temperature, acquires a control command indicating that the oil pump is controlled based on a rotation speed in a case where the temperature of the oil measured by the temperature sensor is larger than the first temperature, and determines whether the oil pump is controlled by either a current value or a rotation speed based on a control command,
in a case where it is determined that a control is performed by a current value, the current determination part determines the current value, and
in a case where it is determined that a control is performed by a rotation speed, the rotation speed determination part determines the rotation speed.

3. An electric oil pump control method for automobile transmission clutch engagement, comprising:
by way of a vehicle control mechanism, measuring a temperature of oil supplied to an oil supply destination relating to clutch engagement of an automobile transmission;
by way of the vehicle control mechanism, outputting, to an electric oil pump, a control command indicating that the electric oil pump is controlled based on a current value, and performing a current control in a case where the measured temperature of the oil is equal to or less than a first temperature and a torque of the oil pump drive motor is smaller than a load of an oil pump drive motor;
by way of the electric oil pump, determining a current value output to the oil pump drive motor to a predetermined current value determined such that the oil pump drive motor is capable of being driven without stopping based on the command signal;
by way of the oil pump, supplying oil to the oil supply destination by the oil pump drive motor being driven based on the determined current value in a case where the measured temperature of the oil is equal to or less than the first temperature;
determining a rotation speed of the oil pump drive motor per predetermined time based on a correspondence relationship between a command duty ratio and an aim rotation speed in response to a required flow rate of the oil supply destination, and performing a rotation speed control in a case where the measured temperature of the oil is larger than the first temperature and the torque of the oil pump drive motor is not smaller than the load of the oil pump drive motor; and
by way of the oil pump, supplying oil to the oil supply destination by the oil pump drive motor being driven based on the determined rotation speed in a case where the measured temperature of the oil is larger than the first temperature.

4. A vehicle, comprising:
a temperature sensor that measures a temperature of oil supplied to an oil supply destination relating to clutch engagement of an automobile transmission;
an oil pump drive motor;
an oil pump; and
a drive device that includes a computer and a program executed by the computer for realizing a current determination part and a rotation speed determination part,
wherein in a case where the temperature of the oil measured by the temperature sensor is equal to or less than a first temperature and a torque of the oil pump drive motor is smaller than a load of the oil pump drive motor, a current control is performed in which the current determination part determines a current value output to the oil pump drive motor to a predetermined current value determined such that the oil pump drive motor is capable of being driven without stopping, and the oil pump supplies oil to the oil supply destination by the oil pump drive motor being driven based on the determined current value; and
in a case where the temperature of the oil measured by the temperature sensor is larger than the first temperature and the torque of the oil pump drive motor is not smaller than the load of the oil pump drive motor, a rotation speed control is performed in which the rotation speed determination part determines a rotation speed of the oil pump drive motor per predetermined time based on a correspondence relationship between a command duty ratio and an aim rotation speed in response to a required flow rate of the oil supply destination, and the oil pump supplies oil to the oil supply destination by the oil pump drive motor being driven based on the determined rotation speed.

5. A vehicle electric oil pump for automobile transmission clutch engagement, comprising:
a temperature sensor that measures a temperature of oil supplied to an oil supply destination relating to clutch engagement of an automobile transmission;
an oil pump drive motor; and
a drive device that includes a computer and a program executed by the computer for realizing a current determination part and a rotation speed determination part,
wherein in a case where the temperature of the oil measured by the temperature sensor is equal to or less than a first temperature and a torque of the oil pump drive motor is smaller than a load of the oil pump drive motor, a current control is performed in which the current determination part determines a current value output to the oil pump drive motor to a predetermined current value determined such that the oil pump drive motor is capable of being driven without stopping, and the oil pump supplies oil to the oil supply destination by the oil pump drive motor being driven based on the determined current value; and
in a case where the temperature of the oil measured by the temperature sensor is larger than the first temperature and the torque of the oil pump drive motor is not smaller than the load of the oil pump drive motor, a rotation speed control is performed in which the rotation speed determination part determines a rotation speed of the oil pump drive motor per predetermined time based on a correspondence relationship between a command duty ratio and an aim rotation speed in response to a required flow rate of the oil supply destination, and the oil pump supplies oil to the oil supply destination by the oil pump drive motor being driven based on the determined rotation speed.

6. The electric oil pump for automobile transmission clutch engagement according to claim 1, wherein the first temperature is −20° C.

7. The electric oil pump for automobile transmission clutch engagement according to claim 1, wherein in a case where the temperature of the oil measured by the temperature sensor is larger than the first temperature and is equal to or less than a second temperature, when the torque of the oil pump drive motor is not smaller than the load of the oil pump drive motor, the rotation speed control is performed.

8. The electric oil pump for automobile transmission clutch engagement according to claim 7, wherein the first temperature is −20° C., and the second temperature is 120° C.

* * * * *